No. 639,980. Patented Dec. 26, 1899.
M. HICKEY.
APPARATUS FOR RECOVERING WASTE ALCOHOL FROM CASKS.
(Application filed Aug. 11, 1899.)
(No Model.) 4 Sheets—Sheet 1.
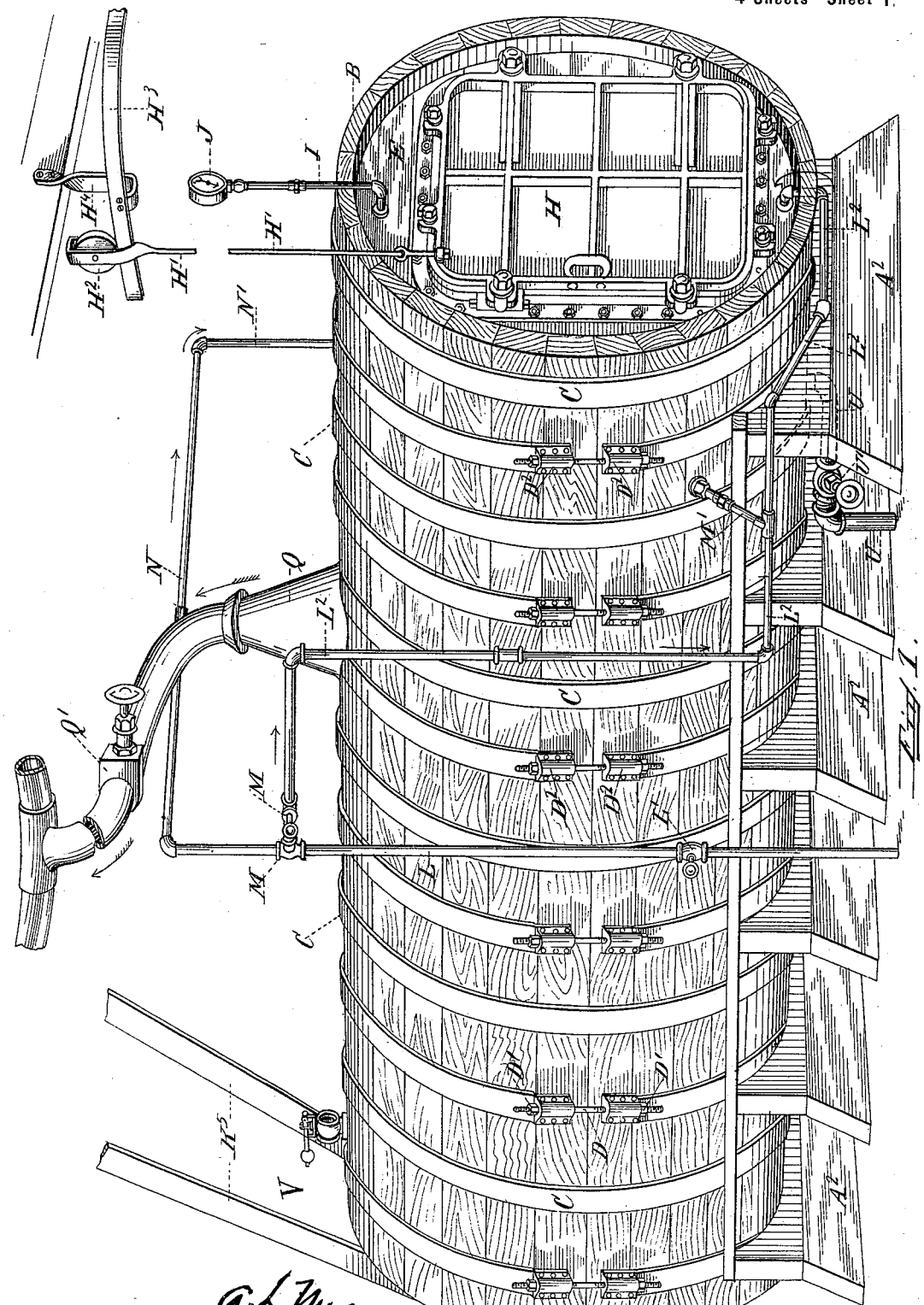

No. 639,980. Patented Dec. 26, 1899.
M. HICKEY.
APPARATUS FOR RECOVERING WASTE ALCOHOL FROM CASKS.
(Application filed Aug. 11, 1899.)
(No Model.) 4 Sheets—Sheet 2.
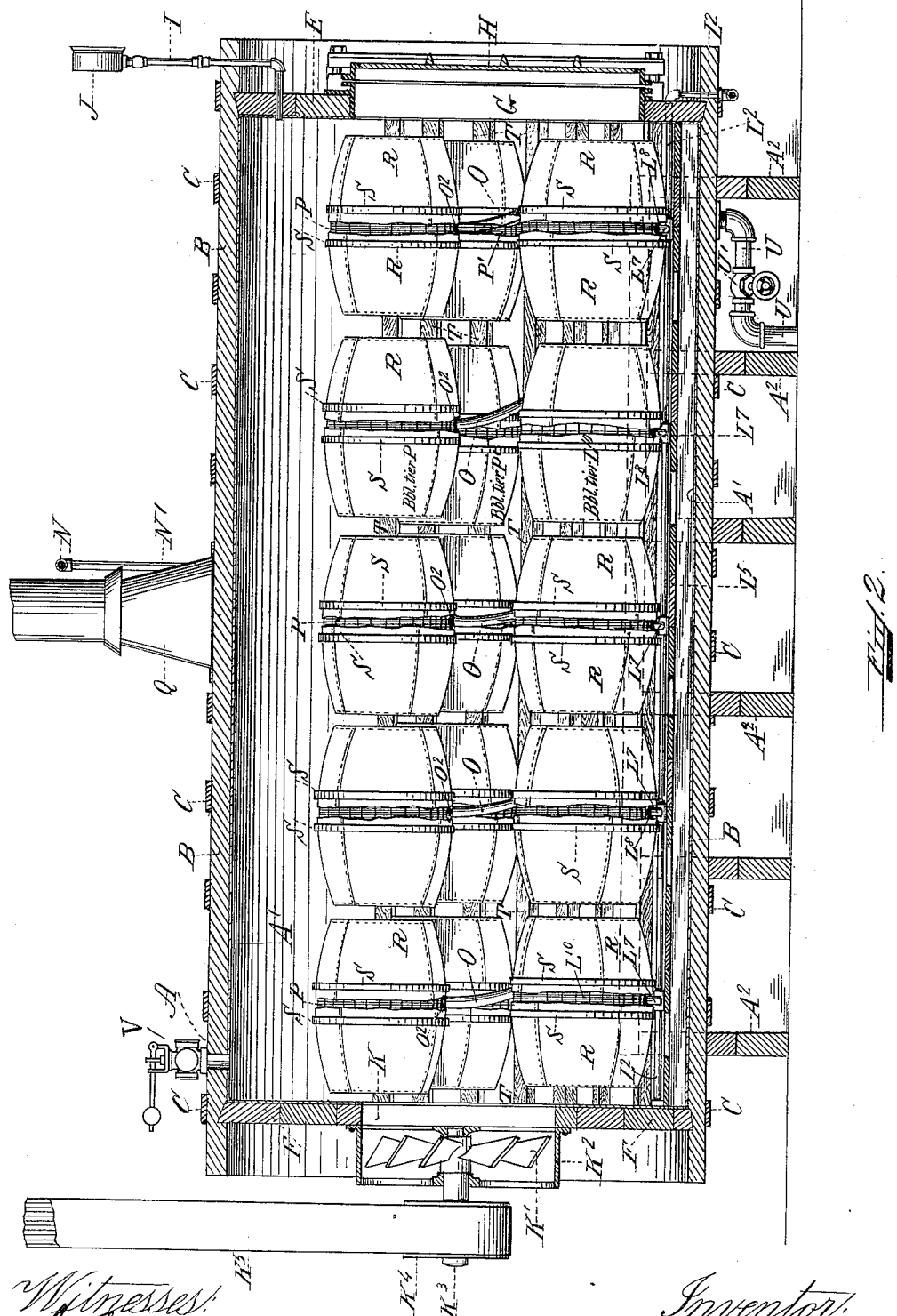

No. 639,980. Patented Dec. 26, 1899.
M. HICKEY.
APPARATUS FOR RECOVERING WASTE ALCOHOL FROM CASKS.
(Application filed Aug. 11, 1899.)
(No Model.) 4 Sheets—Sheet 3.
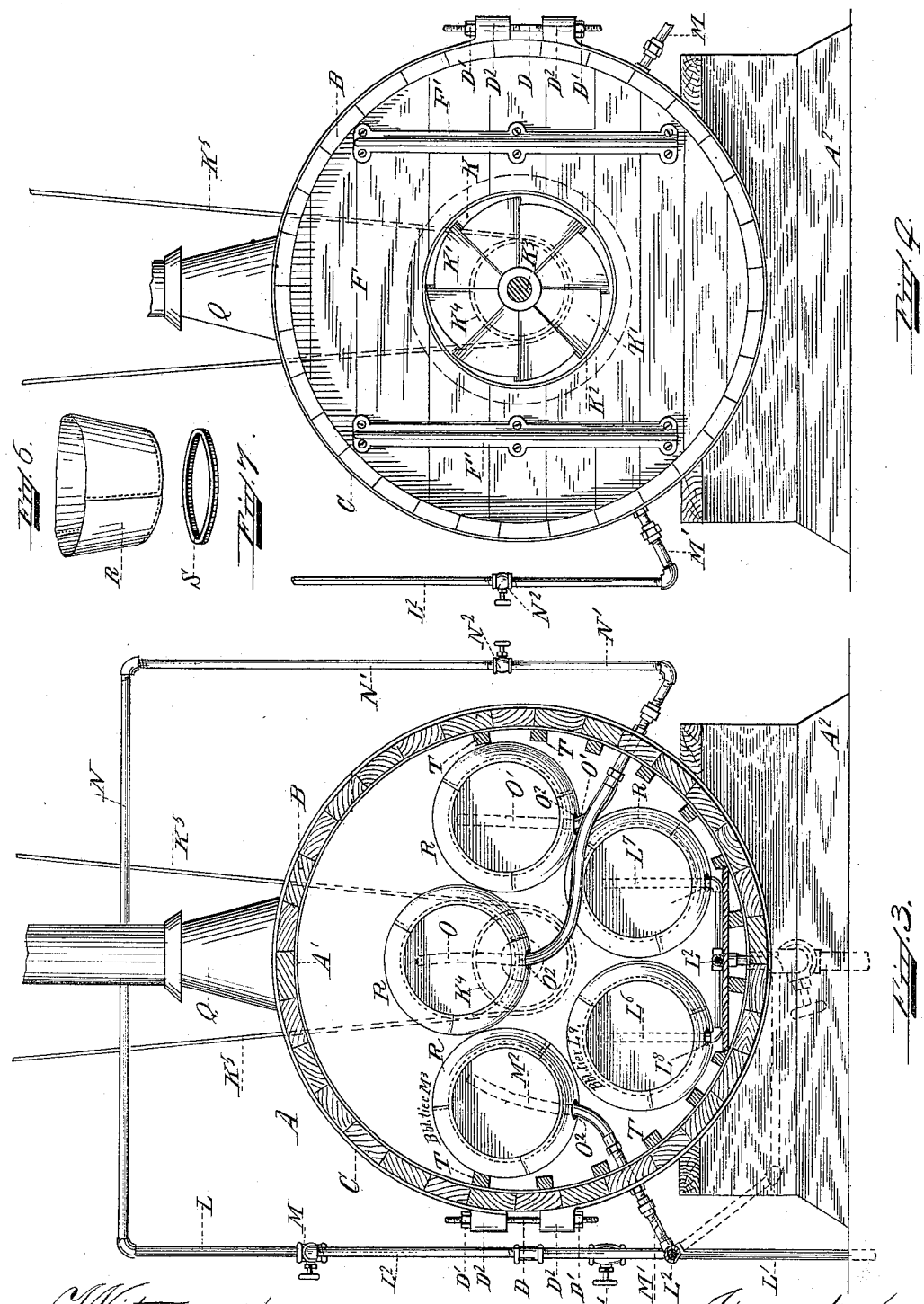

No. 639,980. Patented Dec. 26, 1899.
M. HICKEY.
APPARATUS FOR RECOVERING WASTE ALCOHOL FROM CASKS.
(Application filed Aug. 11, 1899.)
(No Model.) 4 Sheets—Sheet 4.
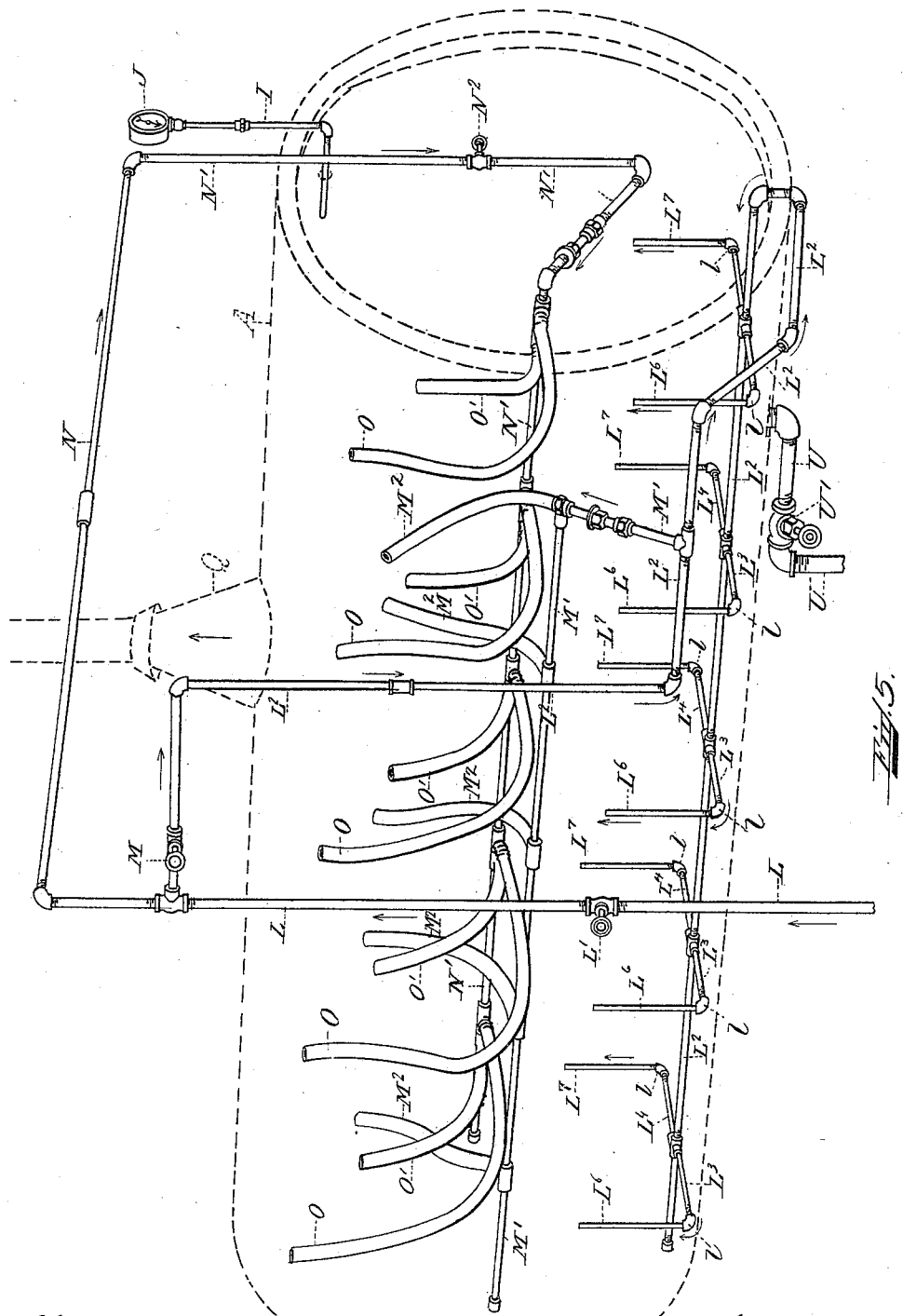

UNITED STATES PATENT OFFICE.

MICHAEL HICKEY, OF BOSTON, MASSACHUSETTS.

APPARATUS FOR RECOVERING WASTE ALCOHOL FROM CASKS.

SPECIFICATION forming part of Letters Patent No. 639,980, dated December 26, 1899.

Application filed August 11, 1899. Serial No. 726,862. (No model.)

*To all whom it may concern:*

Be it known that I, MICHAEL HICKEY, of Boston, in the county of Suffolk and State of Massachusetts, have invented certain new and useful Improvements in Apparatus for Recovering Waste Alcohol from Casks, Barrels, &c., of which the following is a specification.

My invention relates to apparatus for recovering waste alcohol from casks and barrels; and the object of my invention is to recover the alcohol which is absorbed by the casks and barrels, as a large percentage of the contained alcohol is taken up by the wood of which the casks are made, and especially so where the interior of the cask has been charred, in which case the amount of absorbed alcohol is greater owing to the porous nature of the charred wood.

A further object of my invention is to prevent the blackening of the barrels due to the steam and volatilized alcohol in the tank in which the casks are located during the recovering operation.

My invention consists of certain novel features hereinafter described, and particularly pointed out in the claims.

In the accompanying drawings, which illustrate a construction embodying my invention, Figure 1 is a perspective view of the tank in which the casks are located during the operation of recovering waste alcohol. Fig. 2 is a longitudinal sectional view through the tank with the central and right-hand lower and upper tiers of barrels in full lines. Fig. 3 is a cross-sectional view through the tank with the barrels in full lines. Fig. 4 is an end elevation of the tank, showing the fan for cooling the inside of the tank by exhausting the vapors. Fig. 5 is a perspective view of the steam-pipe connections for introducing steam into the casks or barrels. Fig. 6 is a perspective view of one of the rubber coverings for the barrels. Fig. 7 is a perspective view of one of the elastic bands for holding the covering on the barrel during the operation of recovering the alcohol.

Like letters of reference refer to like parts throughout the several views.

A represents a tank which is constructed of a copper lining A' and a number of surrounding longitudinal wooden strips B, which are held together by the metal bands C, which can be adjusted on said tank by screw-threaded bolt D and the nuts D', which contact with the lugs $D^2$ on the band C and hold each band in its adjusted position. The tank is provided with front and rear wooden heads E and F and is supported by a series of cradles $A^2$. In the front head there is a suitable opening G, which is closed by the door H, of any suitable construction, and may be locked by any suitable locking mechanism to the front head, so as to close the opening G. The free end of the door in its movement is supported by the rod H', provided with the roller $H^2$ at its upper end, which roller travels along the curved runway $H^3$, supported by the brace $H^4$, secured to the ceiling or other suitable support. The pipe I leads from the interior of the tank and is provided on its upper end with the gage J to indicate the pressure within the tank. The rear head F is braced by suitable iron girders and is provided with a suitable opening K, in which is located the fan K', surrounded by a suitable guard $K^2$, and said fan is mounted fast on the shaft $K^3$, having a fixed pulley $K^4$, driven by the belt $K^5$, which in turn is driven by any suitable power for exhausting the vapors within the tank, so that the temperature may be reduced sufficiently to enable the workmen to enter the tank to remove the casks already treated and substitute others for treatment. During the treatment of the barrels the fan is not in operation, but is set in motion at the proper time to reduce the temperature, as above described.

The steam passes from a suitable boiler by the pipe L, provided with a suitable controlling-valve L', and from said pipe leads on one side of the tank the steam-pipe $L^2$, which passes into the tank, Fig. 2, and is located centrally on the platform $L^5$, and said pipe $L^2$ is provided at different points with the laterally-extending pipes $L^3$ $L^4$, to which are swiveled at 1 the pipes $L^6$ $L^7$, which extend up into the casks $L^9$ $L^{10}$, which constitute the two lower tiers of casks or barrels. These pipes $L^6$ $L^7$ are smaller in diameter than the bung-holes $L^8$ in the two bottom rows of barrels $L^9$ $L^{10}$. From the branch pipe $L^2$, having a suitable controlling-valve M, extends the branch steam-pipe M', which passes through into the tank and extends longitudinally along the left-hand side of said tank and is provided with a number of flexible rubber tubes M², one for each of the barrels M³ in the upper row on the left-hand side of the tank. The steam-pipe L' is provided with a horizontal branch pipe N, which communicates with the vertical branch pipe N', controlled by a suitable valve N², and said pipe passes into the tank A and extends longitudinally along the right-hand side of the tank and is provided with a number of flexible rubber tubes O, one for each of the barrels P in the center of the tank, and with a number of flexible rubber tubes O', one for each of the barrels P', located along the right-hand side of the tank. All these tubes M², O, and O' are smaller in diameter than the bung-holes O² of the barrels to provide open communication between the interior of the tank and each of the barrels, so that the pressure within the barrels and within the tank is the same, and the danger of the barrels being injured in any way by the pressure within them is removed. By reason of this equal pressure the bracing of the heads of the casks is unnecessary.

Q represents a pipe having a suitable valve Q', and by means of said pipe the volatilized alcohol is led to a suitable condenser.

In operation when the door H is closed and the valves L', M, and N² are opened the steam enters the interior of each cask or barrel L⁹, L¹⁰, M³, P, and P' through the connections above described and volatilizes more or less of the absorbed alcohol which passes out through the bung-hole and is confined within the closed tank, and the only escape of said volatilized alcohol is through the pipe Q to the condenser, where it is condensed and recovered. After the casks have been confined about two hours within the tank the valve L' is closed, which cuts off the steam, and the door H is opened. The fan is then turned on and reduces the temperature within the tank, so that the workmen can remove the casks and introduce a new set for treatment.

The pipes L⁶ L⁷ are swiveled, so that they may be turned down as the lower tiers of barrels or casks are removed after treatment to provide room for a more easy manipulation of the barrels. To prevent the barrels being injured by the acid from the wood or iron which are affected by the steam, the barrels are covered with canvas, rubber, or other coverings R, which are placed over the ends of the barrels and are held thereon by an elastic band S during the treatment of the barrels, and said bands prevent the steam and vapor passing under the coverings and getting into contact with the barrels. When the barrels are taken out of the tank after treatment and the coverings removed, the barrels are the same in appearance as before being treated and can be sold as new barrels.

A series of narrow strips of wood T are secured to the inside of the tank to prevent the barrels coming into contact with the copper lining, which lining keeps the alcoholic vapors and steam from contact with the strips of wood B, forming the outside of the tank; but although I have shown and described a copper lining such lining is not necessary, but is a preferable arrangement.

By placing the barrels, as shown, with the bung-holes down they are more easily cleansed of the glue, rubber, or coloring-matter that may be in them, and such waste matter passes out through the bung-holes and through the slatted platform L⁵ and out through the waste-pipe U, having a suitable controlling-valve U' and connected to the sewer. The glue, rubber, coloring-matter, and other refuse are driven inwardly by the intense heat around the barrels, and the steam within the barrels acts on such matter and creates a pressure and drives the same down through the bung-holes, and thus thoroughly cleanses the barrels. If the barrels were placed with the bung-holes up, the waste matter above mentioned would not be entirely removed, but a certain amount would settle and remain in the bottom of the barrels, so that this placing of the barrels with the bung-holes down is important.

A safety-valve V is provided to relieve any excess of pressure within the tank A.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In an apparatus of the character specified, a tank for receiving the empty casks, a main steam-pipe, one or more branch steam-pipes from said main steam-pipe, connections leading from said branch pipes into the interior of each cask, a pipe leading from said tank for the passage of the volatilized alcohol to the condenser, a pipe leading from the bottom of the tank for the passage of the refuse matter from the interior of said casks, and valves controlling said pipes.

2. In an apparatus of the character specified, a tank for receiving the empty casks, a main steam-pipe, one or more branch steam-pipes from said main steam-pipe, connections leading from said branch steam-pipes into the interior of each cask, a pipe leading from said tank for the passage of the volatilized alcohol to the condenser, a pipe leading from the bottom of the tank for the passage of the refuse matter from the interior of said casks, valves controlling said pipes, and means for cooling the interior of said tank after the steam is shut off.

3. In an apparatus of the character specified, a tank for receiving the empty casks, a main steam-pipe, one or more branch steam-pipes from said main steam-pipe, connections leading from said branch steam-pipes into the interior of each cask, a pipe leading from said tank for the passage of the volatilized alcohol to the condenser, a pipe leading from the bottom of the tank for the passage of the refuse matter from the interior of said casks, valves controlling said pipes, and a fan for cooling the interior of said tank after the steam is shut off.

4. In an apparatus of the character specified, a tank for receiving the empty casks, a main steam-pipe, one or more branch steam-pipes from said main steam-pipe, connections leading from said branch pipes upwardly into the interior of each cask through the bung-hole and of smaller diameter than said bung-hole, and a pipe leading from said tank for the passage of volatilized alcohol to the condenser.

5. In an apparatus of the character specified, a tank for receiving the empty casks, a steam-pipe located in said tank and provided with vertical extensions of smaller diameter than the bung-holes of said casks and adapted to enter said casks through the bung-holes and hold the casks in position, and a pipe leading from said tank for the passage of the volatilized alcohol to the condenser.

6. In an apparatus of the character specified, a tank for receiving the empty casks, a steam-pipe located in said tank and provided with movable vertical extensions of smaller diameter than the bung-holes of said casks and adapted to enter said casks through the bung-holes and hold the casks in position, and a pipe leading from said tank for the passage of the volatilized alcohol to the condenser.

7. In an apparatus of the character specified, a tank for receiving the empty casks, a steam-pipe for supplying steam to the interior of each cask, and a fan for cooling the interior of the tank when the steam is shut off.

8. In an apparatus of the character specified, a tank for receiving the empty casks, a steam-pipe for supplying steam to the interior of each cask, a covering for each cask, and means for holding said covering in place on the casks.

In testimony whereof I have signed my name to this specification, in the presence of two subscribing witnesses, this 7th day of August, A. D. 1899.

MICHAEL HICKEY.

Witnesses:
A. L. MESSER,
C. A. STEWART.